United States Patent Office 3,184,436
Patented May 18, 1965

3,184,436
POLYCARBONAMIDES OF IMPROVED DYE AFFINITY HAVING THE BENZENE SULFONIC ACID SALT MOIETY AS AN INTEGRAL PART OF THE POLYMER CHAIN
Eugene Edward Magat, Wilmington, Del., assignor to E. I. du Pont de Nemours and Company, Wilmington, Del., a corporation of Delaware
No Drawing. Filed Sept. 4, 1959, Ser. No. 838,027
28 Claims. (Cl. 260—78)

This invention relates to a fiber-forming, synthetic polyamide polymer and the shaped articles produced therefrom. More particularly it is concerned with a polyamide, its fiber-forming copolyamides and shaped articles produced therefrom which are particularly sensitive to a basic type dye.

It is an object of the present invention to provide a novel and useful polyamide.

Another object is to provide a shaped article produced from a polyamide, the said article being sensitive to a basic type dye.

A further object is to provide a process for the production of a polyamide from which shaped articles having affinity toward a basic type dye can be prepared.

These and other objects will become apparent in the course of the following specification and claims.

The polymer of the present invention is useful in the production of shaped articles by extrusion, molding, casting in the nature of yarns, fabric, pellicles, bearings, ornaments or the like.

The present invention provides a novel polycarbonamide wherein recurring carbonamide linkages are an integral part of the polymer chain and containing as an integral part of the polymer chain at least about 0.75 mol percentage of units of the structure:

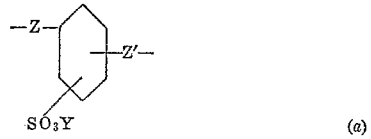

(a)

wherein the hexagon represents the benzene nucleus, —Z— and —Z'— are the same or different members of the class consisting of

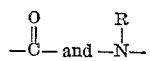

either of which may be separated from the benzene ring by —(CH$_2$)$_n$—, $n$ being a number from zero to 6, R— is a member of the class consisting of hydrogen and lower alkyl, Y is a member of the class consisting of hydrogen, the ammonium radical, a metal of the first group of the periodic table and a metal of the second group of the periodic table and the radicals —Z— and —Z'— are relatively disposed in either the meta or para positions. When the —Z— and —Z'— radicals are relatively situated meta to one another it is preferred that the radical —SO$_3$Y be disposed to produce symmetrical substitution on the benzene nucleus.

In a typical preparation the polymer is formed by polymerizing a compound of the formula:

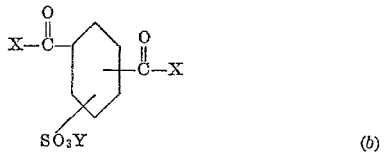

(b)

with a diamine of the formula:

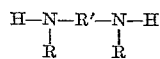

(c)

wherein —R is a member of the class consisting of hydrogen and lower alkyl, —R'— is a divalent organic radical, —X is a member of the class —OH, —Cl and —OR", R" being a monovalent organic radical such that R"—OH is volatile below the decomposition point of the polymer formed, the remaining symbols having the connotations ascribed above. The dibasic acid employed in the polyamide formation may be prepared by conventional techniques by sulfonating terephthalic or isophthalic acids or by sulfonating meta or para xylene, followed by oxidation of the methyl groups. The nature of the radical —R'— in the diamine is not critical. Preferably it is a hydrocarbon radical containing no more than about 20 carbon atoms. Typical suitable diamines include ethylenediamine, tetramethylenediamine, hexamethylenediamine, octamethylenediamine, decamethylenediamine, p-xylylenediamine, p-phenylenediamine, hexahydro-p-phenylenediamine, bis(4-aminocyclohexyl)methane piperazine, dimethylpiperazine, tetramethylpiperazine, the N,N'-dimethyl, the N,N'-diethyl and the N,N'-diisopropyl derivatives of the above and the like as well as mixtures thereof. Other polycarbonamide acidic components are preferably present in preparing the fiber-forming product. Suitable such materials are within the formula

(d)

wherein the symbols —R'— and —X are as defined above. Typical acids of this class are oxalic, adipic, suberic, pimelic, azelaic, sebacic, brassylic, p-phenylene diacetic, isophthalic, terephthalic, hexahydroterephthalic, and the like and mixtures thereof.

In another typical preparation the polymer is formed by polymerizing a compound of the formula:

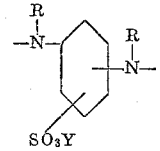

wherein the symbols —R and —Y are defined as described above, with an acid as defined by Formula d above. Copolymeric diamino components may be formed from diamines as expressed in Formula c above.

A third typical preparation employs a sulfonated amino acid of the formula:

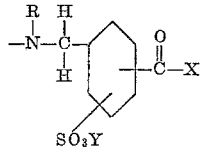

wherein —R, —X and —Y are as defined above in a polymerization wherein diamine (c) and dibasic acid (d) above may be present as copolymeric constituents. In any of the above preparations it will be obvious that mixtures of the sulfonate containing radical compounds may be used and that amino acids, such as amino caproic acid may be used as copolymerizing components.

The polymerization may proceed by any known technique, i.e., employing melt, solution or interphase systems. By an "interphase" polymerization is meant a process whereby the diamine in one liquid phase and the acid chloride in a second liquid phase immiscible with the first phase, are mixed, at least one of the phases including a liquid diluent, the admixture being maintained until the condensation polymerization has occurred to the extent desired. Such a process is described in United States application No. 226,065, filed May 12, 1951, now U.S. Patent 2,831,834. When a melt polymerization technique is employed it is essential that —Y be other than hydrogen to prevent cross linking through the sulfonate group.

The following examples are cited to illustrate the invention. They are not intended to limit it in any manner.

Example 1

Sulfoisophthalic acid is prepared by treating 340 grams of isophthalic acid with 1,360 grams of 25% fuming sulfuric acid for 8 hours at about 195° C. After cooling, the mixture is poured over 1,040 grams of ice. The precipitated product is filtered off and is thereafter purified by recrystallization from an aqueous solution containing 20% by weight hydrochloric acid.

10 grams of the sulfoisophthalic acid prepared as described above is dissolved in 15 grams of water and adjusted to a pH of 3.5 by addition of lithium carbonate to form the lithium sulfonic acid salt. Hexamethylene diamine is then gradually added until the pH is raised to 7.5, thereby forming the hexamethylene diamine salt of lithium sulfoisophthalic acid. The solution is charged to an autoclave where it is heated for one hour at 225° C. under autogeneous pressure. This is followed in succession by one hour at 218° C. under atmospheric pressure, one hour at 218° C. under 3 to 6 millimeters of mercury pressure, one hour at 283° C. under atmospheric pressure and finally one hour at 283° C. under 3 to 6 millimeters of mercury pressure. The product is a white solid having an inherent viscosity of about 0.3. It is soluble in water and up to about 25% by weight in an aqueous solution containing 48% by weight hexamethylenediammonium adipate. It can be cast into film and has particular utility as a water-soluble sizing for textiles and as a water-removable grease protective coating. It may also be employed as a constituent in the production of a fiber-forming copolyamide as is illustrated below.

Example 2

Five grams of the polymeric product of Example 1 is dissolved in 31.2 grams of an aqueous solution containing 48% by weight of hexamethylenediammonium adipate. This mixture is polymerized by the successive heating stages of one hour at 225° C. under autogenous pressure, one hour at 218° C. under 2 to 6 millimeters of mercury, one hour at 255° C. under atmospheric pressure and a final two hours at 283° C. under atmospheric pressure. The product containing 14.2 mol percentage of lithium sulfonic acid salt of isophthalic acid is colorless and opaque. It may be cast as a film. It has an inherent viscosity of 0.31 in m-cresol. When a rod is touched to the surface of its melt and drawn away a fiber is formed. It is spinnable into fibers.

Example 3

Two grams of the polymeric product of Example 1 is dissolved in 47.5 grams of an aqueous solution containing 48% by weight of hexamethylenediammonium adipate. The polymerization cycle of Example 2 is employed. The product, containing 5.4 mol percent of the lithium sulfonic acid salt of isophthalic acid, has an inherent viscosity in m-cresol of 0.58 and is spinnable into fibers. Its shaped structures are colorless and opaque.

The ammonium and metallic sulfonic acid salts of tere and isophthalic acids are useful in as small quantities as 0.75 mol percentage as a fiber-forming copolyamide constituent to impart improved sensitivity toward basic dyes by the formed fiber. Such copolymers are illustrated in Examples 4 to 7 inclusive below.

Example 4

Sulfonated terephthalic acid is prepared by refluxing 300 grams of terephthalic acid with 1200 grams (652.2 ml.) of fuming sulfuric acid (30% $SO_3$) for 8 hours at 210° C. The system is protected from moisture by attaching a drying tube at the top of the condenser. The reaction mixture is then cooled and poured over 900 grams of ice precipitating sulfonated terephthalic acid. The crude product is recrystallized from hot aqueous, constant boiling HCl solution containing activated charcoal. It is then collected by suction filtration as pale yellow crystals and thereafter dried in an oven at 100° C. for 24 hours. A concentrated aqueous solution of the acid is poured into 500 milliliters of water containing 500 grams of potassium acetate. The potassium sulfonic acid salt of terephthalic acid precipitates. It is recrystallized from boiling water as a fine, snow-white crystal (44% yield).

The hexamethylene diamine salt is then prepared by adding a solution of 32.6 grams of anhydrous hexamethylene diamine in 400 cc. of absolute ethanol to 70.8 grams of the potassium sulfonic acid salt of terephthalic acid dissolved in 700 cc. of absolute ethanol. The mixture is cooled and the slurry formed filtered and dried (at 65° C. in a vacuum oven).

A fiber-forming polyamide is prepared by heating 280 grams of an aqueous solution containing 25% by weight of the salt prepared as described in a distilling tube with 2940 grams of an aqueous solution containing 47.7% by weight of the hexamethylene diamine salt of adipic acid and 3.2 grams of acetic acid, in a stream of oxygen-free nitrogen to a temperature of about 174° C. After five hours, pressure on the system is increased to 250 pounds per square inch while the temperature is permitted to rise to 281° C. over a ½ hour period. The system is then vented to 125 pounds per square inch at a temperature of 278° C. An aqueous solution containing 20% by weight of titanium dioxide pigment is added. After 6½ hours total reaction time, the tube is vented to atmospheric pressure and the temperature of the mass is held at 278° C. to complete a total polymerizationi period of 7 hours. The polymer is extruded under a pressure of 20 pounds per square inch through a 13-hole spinneret (orifice diameter of 0.009 inch) to produce a 300 denier yarn. The yarn is collected at about 2500 feet per minute. It is pin drawn about 2.9 times its extruded length (pin temperature of about 83° C.) and given a Z twist of ½ turn per inch to produce a 60 denier yarn. The yarn has a relative viscosity of 33 and a tenacity of 3.0 grams per denier.

A swatch of knit tubing prepared from the above yarn is immersed for 2 hours at a temperature of 100° C. in a dyebath having the following composition:

2.0% [1] Victoria Pure Blue BO dye (C.I. Pr. 198)
2.0% [1] Emulphor [2] ON–870
0.5% [1] glacial acetic acid

[1] Percentages of dyebath components are based on the weight of fabric dyed.
[2] A water-soluble polyethylene ether of a fatty alcohol, sold by General Dyestuffs Corporation, of New York, N.Y.

The ratio of dyebath to fabric is maintained at 50:1 (dyebath:fabric). The sample is thereafter scoured at 160° C. in an aqueous solution containing 2.0% Emulphor ON–870. It is rinsed and dried. It dyes a deep blue. A comparative sample of tubing knitted from commercially available yarn produced from polyhexamethylene adipamide dyes to a pale blue shade under the same conditions.

Example 5

0.28 gram of the hexamethylene diamine salt of isophthalic acid lithium sulfonate, prepared as described in Example 1, is placed in a vacuum tube with 13.7 grams of hexamethylenediammonium adipate and 0.03 gram of benzoic acid (viscosity stabilizer). The tube is evacuated, flushed with nitrogen and sealed under vacuum. After heating at about 220° C. for ½ hour, a capillary nitrogen bleed is inserted into the polymerizing mass and the temperature is raised to 285° C. over a period of one hour and held at 285° C. for an additional two hours. Vacuum is applied for 10 minutes to remove dissolved gases.

The product, having an inherent viscosity of 1.12 in m-cresol, is press spun at 260° C. through a 0.009 inch diameter capillary. It is thereafter drawn five times its extruded length over a pin heated to 150° C. A skein of the drawn yarn is immersed for ½ hour at the boil in a dyebath containing 2.0% Fuschine SP (C.I. 676) and 2.0% sodium lauryl sulfate. The yarn dyes a vivid red.

A comparative control skein of yarn spun from polyhexamethylene adipamide is only lightly stained by the same procedure.

*Example 6*

A vacuum tube is charged with a mixture of 20.5 grams of caprolactam, 0.42 gram of the hexamethylene diamine salt of isophthalic acid lithium sulfonate and 10 drops of water (catalyst). After nitrogen flushing and evacuation, the tube is heated to 265° C. over ½ hour. Heating is continued at atmospheric pressure for an additional four hours. The vacuum is applied at the elevated temperature for 20 minutes to remove dissolved gases.

A skein of yarn is prepared employing the equipment of Example 5. Extrusion of the polymer (inherent viscosity of 0.92 in m-cresol) is performed at about 220° C. and the yarn is drawn five times its extruded length over a pin heated to 120° C. The skein is dyed to a vivid red in the bath, following the technique of Example 5.

*Example 7*

An autoclave is charged with 104 grams of an aqueous solution containing 48% by weight hexamethylenediammonium adipate, 1.75 grams of the potassium sulfonate of dimethyl terephthalate and 0.71 gram of hexamethylene diamine. The mixture is subjected to the polymerization cycle of Example 3. A spinnable polyamide is produced.

A similar product is formed when N,N-dimethylhexamethylenediamine is substituted for the hexamethylene diamine employed above.

*Example 8*

Using the interfacial polymerization technique, 2.9 grams of sulfonated terephthaloyl chloride dissolved in 20 ml. of chloroform is added to a mixture of 1.14 grams of dimethyl piperazine, 20 ml. of chloroform and 3.03 grams of triethylamine. The reaction mass is cooled in ice to absorb heat generated by the reaction. Thereafter acetone is added to precipitate the polymer. 2.1 grams (65% yield) is filtered off. The product is a yellow brittle powder soluble in water and meta cresol and has an inherent viscosity of 0.19.

The calcium salt of the above polymer formed by addition of calcium acetate is mixed in an aqueous solution containing hexamethylene diammonium adipate in the manner taught in Example 3 above. Polymerization following the cycle of Example 2 yields a product spinnable into fibers.

*Example 9*

A mixture of 0.283 gram of 5-sulfoisophthaloyl chloride (prepared by treating sulfoisophthalic acid with thionyl chloride, condensing hydrochloric acid) and 3.86 grams of isophthaloyl chloride is added to a cooled mixture of 2.16 grams of metaphenylenediamine and 20 ml. of dimethylacetamide. The mixture becomes viscous slowly. After a period of one hour the product is dried and a pink fibrous solid having an inherent viscosity in sulfuric acid of 0.85 is recovered. A grayish pink film is cast from this polymer.

*Example 10*

A polymer containing 2.5% of sulfonic acid unit modification is prepared by adding 4.06 grams of isophthaloyl chloride to a cooled mixture of 0.094 gram of 2,4-diaminobenzene sulfonic acid, 2.11 grams of metaphenylenediamine and 35 ml. hexametaphosphoramide. The mixture is stirred overnight at room temperature and a clear viscous solution forms. After stirring for 24 hours at room temperature the modified product having an inherent viscosity in sulfuric acid of 0.97 is recovered. A film [3] pressed from this polymer is readily dyeable with basic dyes.

A similar product containing 5% of the modified unit and having an inherent viscosity in sulfuric acid of 0.80 is prepared by adding 2.05 grams of metaphenylenediamine to a mixture of 0.188 gram of 2,4-diaminobenzene sulfonic acid and 20 ml. of dimethyl acetamide and after cooling, adding 4.06 grams of isophthaloyl chloride. The product is precipitated, washed with water and methanol and dried at 70° C. in a vacuum.

An attempt is made to sulfonate polymetaphenylenediamine isophthalamide having an inherent viscosity in sulfuric acid of 1.36. Upon stirring 20 grams of polymer with 300 grams of fuming sulfuric acid (containing 25% free $SO_3$) for 15 minutes at room temperature the polymer, precipitated into water and washed with water, is degraded to such an extent that the resulting inherent viscosity in sulfuric acid is only 0.26 (sulfur content of 2.67% by weight). When sulfonation is attempted under milder conditions, i.e. using 300 grams of fuming sulfuric acid, 10 grams of polymetaphenylenediamine isophthalamide stirred in an ice bath for 2 hours and precipitated into and thereafter washed with anhydrous ether, the inherent viscosity in sulfuric acid of the polymer is reduced from 1.48 to 0.21 (sulfur content 6.43%).

*Example 11*

A polymer containing 25% of 2,4-diaminobenzene sulfonic acid is prepared by adding 4.06 grams of isophthaloyl chloride to a cooled (ice bath) mixture of 0.94 gram of 2,4-diaminobenzene sulfonic acid, 1.622 grams of metaphenylenediamine and 35 ml. of hexametaphosphoramide. The ice bath is removed after one minute and the mixture stirred overnight at room temperature to produce a clear viscous solution. After stirring for 24 hours at room temperature the product is washed and dried. 16% yield of polymer having an inherent viscosity of 0.38 is formed.

A mixture of 4.8 grams of polymer prepared as described above, 186 grams of dimethyl acetamide, 2.70 grams of lithium chloride and 48.4 grams of polymetaphenylenediamine isophthalamide (inherent viscosity, sulfuric acid, 1.44) is dry spun at a head temperature between 130–140° C. into a column of 230° C. air at a pressure of 150 pounds per square inch through a spinneret having eight orifices, each orifice being 0.005 inch in diameter. The yarn is wound up at 83 yards per minute, drawn 3.5 times its extruded length in 12 pounds of steam over a hot plate heated to a temperature of 310° C. The fiber has a dog-bone cross section. Its tenacity (at 70° F. and a relative humidity of 65°) is 3.9 at an elongation of 34%, the initial modulus being 83 grams per denier.

The above yarn is dyed at the boil for one hour in a bath containing 4 parts of 1% Basic Red in 210 parts of water and 250 parts of dimethyl acetamide. The sample, scoured for 20 minutes at 80° C., is dyed a brilliant red. The yarn is also readily dyed with Latyl Blue GE and Sulfogene Brilliant Blue under the same conditions.

*Example 12*

3,5-diaminobenzene sulfonic acid is prepared by sulfonating dinitrobenzene and thereafter reducing the 3,5-dinitrobenzene sulfonic acid with ammonium sulfide.

In a copolyamide preparation 4.06 grams of isophthaloyl chloride is added to a cooled (ice bath) mixture of 0.188 gram of 3,5-diaminobenzene sulfonic acid, prepared as described above, 2.05 grams of metaphenylenediamine and 20 ml. of dimethyl acetamide. After stirring for ½ hour at room temperature the polymer is washed with water and methanol and dried in a vacuum oven at 70° C. 5.0 grams of polymer containing 5% of the modifying

---

[3] U.V. exposure causes loss of ½ tenacity and ½ elong. in 115 hrs. and 75 hrs. resp. vs. 40 hrs. and 50 hrs. resp. for unmodified control.

sulfonic acid unit is formed. The product has an inherent viscosity in sulfuric acid of 0.59.

When terephthalic acid or its amide-forming derivative is to be used as the modifying unit, it may be prepared by sulfonation of the acid or derivative with fuming sulfuric acid. During contact of the reactants the system is protected from moisture. Upon completion of the reaction the product is precipitated from the reaction mass by cooling. If desired the crude product may be crystallized from hot aqueous hydrochloric acid solution. However, this is not essential. Yield of product can usually be improved by removing water formed in the reaction, i.e., by applying a vacuum to remove water vapor as it is formed. Alternatively, sulfur trioxide can be applied to the system to use up water as it is formed in the reaction. The sulfonation reaction is carried out at high temperature, preferably at a temperature at least about 150° C. Temperatures as high as 250° C. are satisfactory. It is preferred that the temperature be within a range of from about 195° to about 220° C. Vapor phase sulfonation is satisfactory. Conventional sulfonation equipment for aromatic compounds may be used. In contacting the reactants a large excess of sulfonation reagent is employed. In liquid phase reactions as much excess as from 50 to 100 times the theoretical quantity of acid may be employed with advantageous results. Due to recovery problems, less excess acid is recommended for commercial operation. The corresponding isophthalic derivative can be similarly prepared and may be employed in the production of the essentially aliphatic polyamides of the present invention.

Where the sulfonation product is an acid, it may be thereafter esterified. Conventional esterification techniques are employed. It is convenient to use a solvent which forms an azeotrope with water to facilitate removal of water of reaction. An 85% benzene 15% methanol mixture is satisfactory for this purpose. Where the use of the acid chloride is desired in the final polymerization the sulfonated acid may be reacted with conventional reagents such as phosphorus pentachloride to produce the sulfonated acid chloride.

In the melt polymerization of the mixed monomers to a fiber-forming product, either the ammonium or metallic salt of sulfonated terephthalic acid or its amide-forming derivatives, or the ammonium or metallic salt of sulfonated isophthalic acid or its amide-forming derivatives may be employed. The replacement of hydrogen upon the sulfonic acid group by ammonium or metallic salt formation prevents cross linking during melt polymerization and permits formation of a linear polymer. Use of the lithium salt is preferred due to its high solubility in polyamide melts. In the formation of homopolyamide or copolyamide by melt polymerization the reactants may be heated together with suitable means employed to remove water formed in the reaction. Diamine is employed in substantially equimolar proportions to the total dibasic acid present during the reaction. The copolymeric products may be formed directly from the corresponding monomers, or as illustrated in Examples 2 and 3, one homopolymer may be added to polymerizable reactants, distribution of the desired units entering the products via amide interchange. Formation of the desired diamine salts of the various dibasic acids prior to melt polymerization assists in control of the reaction. The conventional polyamide melt polymerization cycle is suitable as is illustrated in the examples. Catalytic materials, viscosity stabilizers, pigments and the like may also be present. The melt polymerization is conducted under conditions to prevent oxidation, that is, the presence of oxygen should be avoided and a slow stream of an inert gas, for example, nitrogen or hydrogen, is advantageously passed through and/or over the molten mass. During the polymerization the melting point and the viscosity of the melt gradually increase. The temperature is maintained high enough to keep the mass in the molten state during this heating period. Heating is continued with removal of water of reaction at least until a filament is formed when a rod is touched to the melt and thereafter drawn away. The polymer is conveniently removed from the reaction vessel in molten form, and subsequently cooled. The extruded material is then formed into blocks, chips and the like suitable for feed to melt spinning equipment.

After formation of the fiber-forming copolymer, it may be shaped into filamentary form by conventional spinning techniques. Usually it is spun by extrusion of the melt. After extrusion the filaments can be cold or hot drawn to several times their extruded length to produce molecularly oriented structures. Fibers formed are of good strength and highly pliable.

The yarns produced in accordance with the present invention are suitable for the usual textile applications. They may be employed in the knitting or weaving of fabrics of all types as well as in the production of non-woven, felt-like products produced by known methods. Their properties closely parallel those of aliphatic polyamidic fibers. However, they have particular sensitivity toward basic dyes. By a "basic dye" is meant a colored cationic organic substance such as those containing sulfonium, oxonium, or quaternary ammonium functional groups. Among the basic dies which may be applied to the filament formed in accordance with the present invention may be mentioned Victoria Green WB (C.I. 657); Rhodamine B (C.I. 749); Brilliant Green B (C.I. 662); Victoria Pure Blue BO (Pr. 198); and the like.

Many other modifications within the spirit of the invention will be apparent to those skilled in the art from a reading of the above without a departure from the inventive concept.

This application is a continuation-in-part of United States application No. 519,266, filed June 30, 1955, now abandoned.

What is claimed is:

1. A novel, linear, fiber-forming polycarbonamide wherein recurring carbonamide linkages are an integral part of the polymer chain and containing as an integral part of the polymer chain at least about 0.75 mol percentage based on the weight of the said polycarbonamide of units of the structure:

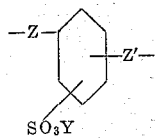

wherein the hexagon represents the benzene nucleus, —Z— and —Z'— are members of the class consisting of

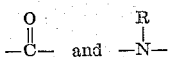

which may be separated from the benzene ring by —(CH$_2$)$_n$— radicals, $n$ being an integer from zero to 6, R— is a member of the class consisting of hydrogen and lower alkyl, Y is a member of the class consisting of hydrogen, the ammonium radical, a metal of the first group of the periodic table and a metal of the second group of the periodic table and the radicals —Z— and —Z'— are relatively disposed in either the meta or para positions.

2. A synthetic, linear, polycarbonamide wherein the repeating carbonamide linkages are an integral part of the polymer chain, consisting essentially of units of the structure:

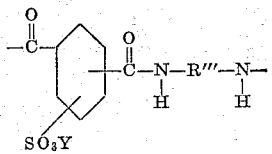

wherein the hexagon represents the benzene nucleus, —R''— is a divalent aliphatic radical, Y is a member of the class consisting of hydrogen, the ammonium radical, a metal of the first group of the periodic table, and a metal of the second group of the periodic table, and the carbonyl radicals are relatively disposed in other than the ortho position and wherein any copolymeric constituents are aliphatic with recurring

groups separated by —CH₂— radicals to provide a total of six carbons between recurring carbonamide nitrogen.

3. A synthetic, linear, fiber-forming copolycarbonamide wherein recurring carbonamide linkages are an integral part of the polymer chain comprising fiber-forming polyhexamethylene adipamide and at least 0.75 mol percentage based on the weight of the said polycarbonamide of the polycarbonamide of claim 2.

4. A synthetic, linear, fiber-forming copolycarbonamide wherein recurring carbonamide linkages are an integral part of the polymer chain comprising polycaprolactam and at least 0.75 mol percentage based on the weight of the said polycarbonamide of the polycarbonamide of claim 2.

5. A synthetic, linear, fiber-forming copolycarbonamide wherein the recurring carbonamide linkages are an integral part of the polymer chain formed by polymerization of reactants consisting essentially of hexamethylenediamine, adipic acid and at least 0.75 mole percentage based on the total weight of the said rectants of a compound of the formula:

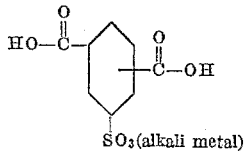

wherein the hexagon represents the benzene nucleus and the carbonyl radicals being relatively disposed in the meta and para positions.

6. A synthetic, linear, fiber-forming copolycarbonamide wherein the recurring carbonamide linkages are an integral part of the polymer chain formed by polymerization of reactants consisting essentially of epsilon-caprolactam, hexamethylene diamine and at least 0.75 mole percentage based on the total weight of the said reactants of a compound of the formula:

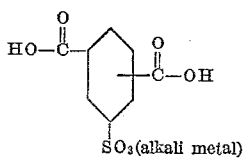

wherein the hexagon represents the benzene nucleus and the carbonyl radicals being relatively disposed in the meta and para positions.

7. A synthetic, linear, fiber-forming copolycarbonamide wherein the recurring carbonamide linkages are an integral part of the polymer chain containing at least about 0.75 mol percentage based on the weight of the said polycarbonamide units of the structure:

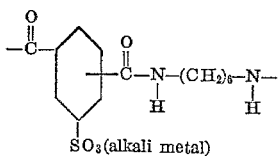

wherein the hexagon represents the benzene nucleus wherein copolymeric constituents are aliphatic with recurring

groups separated by —CH₂— radicals to provide a total of six carbons between recurring carbonamide nitrogen.

8. A synthetic, linear, fiber-forming copolycarbonamide wherein the recurring carbonamide linkages are an integral part of the polymer chain formed by polymerization of reactants consisting essentially of hexamethylenediamine, adipic acid and at least 0.75 mole percentage based on the total weight of the said reactants of a compound of the formula:

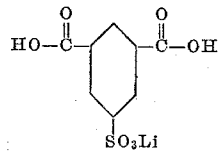

wherein the hexagon represents the benzene nucleus.

9. A synthetic, linear, fiber-forming copolycarbonamide wherein the recurring carbonamide linkages are an integral part of the polymer chain formed by polymerization of reactants consisting essentially of hexamethylene diamine, adipic acid and at least 0.75 mole percentage based on the total weight of the said reacants of a compound of the formula:

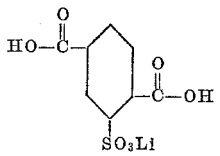

wherein the hexagon represents the benzene nucleus.

10. A fiber-forming synthetic linear polycarbonamide of a dicarboxylic acid and a diamine, additionally containing condensed therein as an integral portion of the main polymer chain, a small amount effective to improve dye affinity, of a compound of the formula:

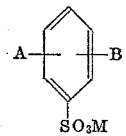

wherein A and B are selected from the group consisting of —COOH and —RCOOH, R being alkylene, and M is an alkali metal.

11. A fiber-forming synthetic linear polycarbonamide of a dicarboxylic acid and a diamine, additionally containing condensed therein as an integral portion of the main polymer chain, a small amount effective to improve dye affinity, of a compound of the formula:

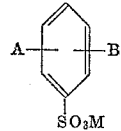

wherein A and B are —RNH₂, R being alkylene, and M is an alkali metal.

12. A fiber-forming synthetic linear polycarbonamide of the type having recurring amide groups as an integral part of the main polymer chain, and wherein said groups are separated by at least 2 carbon atoms, which comprises the interpolymerization product obtained from reactants comprising a first polyamide-forming composition selected from the group consisting of (A) a polymerizable monoaminomonocarboxylic acid, and (B) substantially equimolecular proportions of a dibasic carboxylic acid and a diamine; and a second polyamide-forming composition consisting of from about 0.626 to 5.0 molar percent based on said first polyamide-forming composition of a difunctional aromatic compound of the general formula:

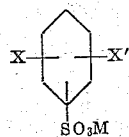

where M is an alkali metal, and X and X' are radicals having identical functional groups, said radicals being selected from the group consisting of COOH, RCOOH where R is an alkylene radical with from 1 to 5 carbon atoms, COOR where R is an alkyl radical containing from 1 to 5 carbon atoms, RCOOR' where R is an alkylene radical containing from 1 to 5 carbon atoms and R' is an alkyl radical containing 1 to 5 carbon atoms, and $RNH_2$ where R is an alkylene radical with from 1 to 5 carbon atoms, and an equiavlent of said difunctional aromatic compound of a compound selected from the group consisting of a diamine when X and X' contain carbonyl groups and a dibasic carboxylic acid when X and X' contain amino groups.

13. The fiber-forming synthetic linear polycarbonamide as set forth in claim 12, wherein said first polyamide-forming composition consists of 6-aminocaproic acid.

14. The fiber-forming synthetic linear polycarbonamide as set forth in claim 12, wherein said first polyamide-forming composition consists of substantially equimolecular proportions of adipic acid and hexamethylenediamine.

15. The fiber-forming synthetic linear polycarbonamide as set forth in claim 12, wherein said difunctional aromatic compound is potassium-3,5-dicarboxybenzene sulfonate.

16. The fiber-forming synthetic linear polycarbonamide as set forth in claim 12, wherein said difunctional aromatic compound is sodium-2,5-dicarboxybenzene sulfonate.

17. The fiber-forming synthetic linear polycarbonamide as set forth in claim 12, wherein said difunctional aromatic compound is sodium-3,5-dicarboxybenzene sulfonate.

18. The fiber-forming synthetic linear polycarbonamide as set forth in claim 12, wherein said difunctional aromatic compound is potassium-2,5-diaminodimethylbenzene sulfonate.

19. The fiber-forming synthetic linear polycarbonamide as set forth in claim 12, wherein said difunctional aromatic compound is potassium-3,5-dicarbomethoxybenzene sulfonate.

20. A textile fiber comprising the polycarbonamide as defined in claim 12.

21. A process for making fiber-forming synthetic linear polycarbonamides with improved receptivity for basic dyestuffs which comprises interpolymerizing a first polyamide-forming composition selected from the group consisting of (A) a polymerizable monoaminomonocarboxylic acid, and (B) substantially equimolecular proportions of a dibasic carboxylic acid and a diamine, with a second polyamide-forming composition consisting of from about 0.626 to 5.0 molar percent based on said first polyamide-forming composition of a difunctional aromatic compound of the general formula:

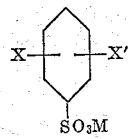

where M is an alkali metal, and X and X' are radicals having identical functional groups, said radicals being selected from the group consisting of COOH, RCOOH where R is an alkylene radical with from 1 to 5 carbon atoms, COOR where R is an alkyl radical containing from 1 to 5 carbon atoms, RCOOR' where R is an alkylene radical containing from 1 to 5 carbon atoms and R' is an alkyl radical containing 1 to 5 carbon atoms, and $RNH_2$ where R is an alkylene radical with from 1 to 5 carbon atoms, and an equivalent of said difunctional aromatic compound of a compound selected from the group consisting of a diamine when X and X' contain carbonyl groups and a dibasic carboxylic acid when X and X' contain amino groups.

22. The process set forth in claim 21 in which said first polyamide-forming composition consists of 6-aminocaproic acid.

23. The process set forth in claim 21 in which said first polyamide-forming composition consists of substantially equimolecular proportions of adipic acid and hexamethylenediamine.

24. The process as set forth in claim 21 wherein said difunctional aromatic compound is potassium-3,5-dicarboxybenzene sulfonate.

25. The process as set forth in claim 21 wherein said difunctional aromatic compound is potassium-2,5-dicarboxybenzene sulfonate.

26. The process as set forth in claim 21 wherein said difunctional aromatic compound is sodium-3,5-dicarboxybenzene sulfonate.

27. The process as set forth in claim 21 wherein said difunctional aromatic compound is potassium-2,5-diaminodimethylbenzene sulfonate.

28. The process as set forth in claim 21 wherein said difunctional aromatic compound is potassium-3,5-dicarbomethoxybenzene sulfonate.

References Cited by the Examiner

UNITED STATES PATENTS

| | | | |
|---|---|---|---|
| 2,244,192 | 6/41 | Flory | 260—78 |
| 2,317,751 | 4/43 | Frolich et al. | 260—78 |
| 2,378,494 | 6/45 | Moncrieff et al. | 260—78 |
| 2,473,924 | 6/49 | Walker | 260—78 |
| 2,925,397 | 2/60 | Hopfner et al. | 260—78 |
| 2,960,486 | 11/60 | Pye | 260—45.7 |

WILLIAM H. SHORT, *Primary Examiner.*

MILTON STERMAN, P. E. MANGAN, H. N. BURSTEIN, *Examiners.*